US011668625B2

(12) United States Patent
Li et al.

(10) Patent No.: US 11,668,625 B2
(45) Date of Patent: Jun. 6, 2023

(54) APPARATUS AND METHOD FOR DETECTING WAVEFRONT ABERRATION OF OBJECTIVE LENS

(71) Applicant: Shanghai Institute of Optics And Fine Mechanics, Chinese Academy of Sciences, Shanghai (CN)

(72) Inventors: Peng Li, Shanghai (CN); Feng Tang, Shanghai (CN); Xiangzhao Wang, Shanghai (CN); Yunjun Lu, Shanghai (CN); Yang Liu, Shanghai (CN); Xiangyu Wei, Shanghai (CN); Yisha Cao, Shanghai (CN); Changzhe Peng, Shanghai (CN)

(73) Assignee: Shanghai Institute of Optics and Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/472,047

(22) Filed: Sep. 10, 2021

(65) Prior Publication Data

US 2022/0299402 A1 Sep. 22, 2022

(30) Foreign Application Priority Data

Mar. 22, 2021 (CN) .......................... 202110302284.X

(51) Int. Cl.
*G01B 11/02* (2006.01)
*G01M 11/02* (2006.01)
(Continued)

(52) U.S. Cl.
CPC ....... *G01M 11/0271* (2013.01); *G01B 9/0209* (2013.01); *G02B 5/08* (2013.01)

(58) Field of Classification Search
CPC ............. G01M 11/0271; G01M 11/02; G01M 11/0242; G01B 9/0209; G01B 9/02018; G01B 9/02024
See application file for complete search history.

(56) References Cited

U.S. PATENT DOCUMENTS 6,469,791 B1\* 10/2002 Stenton .............. G01M 11/0271
356/458
8,203,719 B2\* 6/2012 Murphy ............. G01B 9/02058
356/512
(Continued)

OTHER PUBLICATIONS

Daniel Malacara, "Optical Shop Testing," 3rd M. published by John Wiley & Sons, Inc., Hoboken, New Jersey, p. 71 (2007).

*Primary Examiner* — Tarifur R Chowdhury
*Assistant Examiner* — Jonathon Cook
(74) *Attorney, Agent, or Firm* — Mei & Mark LLP; Manni Li

(57) ABSTRACT

Apparatus and method for detecting wavefront aberration of an objective lens, comprising a wavefront detection system, a planar mirror, and a planar mirror adjusting mechanism; the objective lens is placed between planar mirror and wavefront detection system; planar mirror is positioned at focal point of the objective lens. A test wavefront emitted by wavefront detection system passes through the objective lens, gets reflected by the planar mirror, and t passes through the objective lens again; the wavefront detection system receives and detects the test wavefront to derive a phase distribution thereof; an angle of the planar mirror tilts at is adjusted to obtain different return wavefronts; a polynomial for expressing wavefront aberration is selected, and expressions corresponding to all the return wavefronts are calculated; result of fitting the wavefront aberration of the objective lens when expressed by the selected polynomial is derived through fitting with the polynomial.

3 Claims, 6 Drawing Sheets

(51) Int. Cl.
*G01B 9/0209* (2022.01)
*G02B 5/08* (2006.01)

(56) References Cited

U.S. PATENT DOCUMENTS

| | | | |
|---|---|---|---|
| 8,462,351 B2* | 6/2013 | Oota | G01M 11/0271 |
| | | | 356/515 |
| 8,743,373 B1* | 6/2014 | Gutin | G01M 11/0271 |
| | | | 356/512 |
| 2017/0184455 A1* | 6/2017 | Wang | G01J 9/0215 |
| 2018/0238769 A1* | 8/2018 | Ikawa | G01M 11/0292 |
| 2020/0096326 A1* | 3/2020 | Goodwin | G03F 7/70075 |

* cited by examiner

APPARATUS AND METHOD FOR DETECTING WAVEFRONT ABERRATION OF OBJECTIVE LENS

CROSS-REFERENCE TO RELATED APPLICATIONS

The subject application claims priority to Chinese Patent Application No. 202110302284.X filed on Mar. 22, 2021 in China. The Chinese priority application is incorporated herein by reference.

TECHNICAL FIELD

The present invention relates to the field of optical measurement, and particularly, apparatus and method for detecting wavefront aberration of an objective lens.

BACKGROUND ART

Wavefront aberration of an optical system is one of the key indexes of the imaging quality. Zernike polynomials are preferred in describing the wavefront aberration of an optical system, because they have proper correspondence to the wavefront aberration of the optical system. Generally, to extract the phase information of wavefront aberration from the intensity information, interference patterns are generated by interferometers of various structures, and then the corresponding phase information is obtained by a phase recovery algorithm. Commonly used interferometers include the Fizeau interferometer, which is based on a reference plane, the Twyman-Green interferometer, the Mach-Zehnder interferometer, which is based on lateral shearing principle, and the Ronchi interferometer.

Daniel Malacara, "*Optical Shop Testing*," 3rd M. published by John Wiley & Sons, Inc., Hoboken, New Jersey (2007), discloses a method for detecting a wavefront aberration of an objective lens using a spherical mirror, where a spherical mirror is placed at the focal point of the objective lens and the wavefront reflected by the mirror is detected on the image side through structures such as a Fizeau interferometer or a Tayman Green interferometer, so as to evaluate the imaging quality of the objective lens. The spherical mirror can be a concave or convex mirror, but a microscope objective system with a high NA has a small working distance, and generally, only a concave mirror can be used.

In the existing technology, a range of applicable NAs of the objective lens is limited by f/D and the machining precision of the spherical lens in the detection of the wavefront aberration of the objective lens. The minimum f/D of a commercial spherical standard mirror is 0.65, corresponding to an NA of 0.77, which limits the range of detectable NAs. The numerical aperture of a lithography projection objective system and a bright-field microscopy detection system are all above 0.9, and the RMS value of the wavefront aberration is in the order of nanometers, and it requires a customized high-NA spherical standard mirror with a surface figure accuracy reaching <$\lambda/40$($\lambda=633$ nm, PV) to adopt this solution, in which case, the detection accuracy is restricted by the figure of the spherical standard mirror, and the cost is high.

SUMMARY OF THE INVENTION

The present invention overcomes the defects of the existing technology by providing an apparatus and a method for detecting wavefront aberration of an objective lens, where a planar mirror is used for reflecting a wavefront at a focal point, so that the influence of the machining precision of the planar mirror on a detection result, and the detection cost are reduced, and the problem that the range of detectable NAs is limited by parts of a detection apparatus is solved.

The technical solution of the present invention is to provide an apparatus for detecting wavefront aberration of an objective lens, comprising a wavefront detection system, an objective lens to be detected, a planar mirror, and a planar mirror adjusting mechanism; planar mirror adjusting mechanism bears the planar mirror; the objective lens to be detected is placed between the wavefront detection system and the planar mirror.

In the present invention, the wavefront detection system emits a test wavefront, the test wavefront passes through the objective lens to be detected and then gets reflected by the planar mirror (3) at a focal point of the objective lens to be detected; the reflected wavefront passes through the objective lens (2) to be detected again and is then received and detected by the wavefront detection system.

In the present invention, the position and the posture of the planar mirror are controlled by the planar mirror adjusting mechanism.

In the present invention, the wavefront detection system can emit the test wavefront and can detect a return wavefront reflected by the planar mirror.

In the present invention, the test wavefront sent by the wavefront detection system passes through the objective lens to be detected, gets reflected by the planar mirror, and then passes through the tested objective lens again; then, the wavefront detection system receives and detects the wavefront to obtain a phase distribution thereof. The angle the planar mirror tilts at is adjusted to obtain different return wavefronts. A polynomial for expressing wavefront aberration, such as a Zernike polynomial and a Legendre polynomial, is selected, and expressions corresponding to all the returned wavefronts of the polynomial are calculated, as such, the result of the fitting the wavefront aberration of the objective lens to be detected when expressed by the selected polynomial can be derived through the fitting with the polynomial.

The present invention further provides a method for detecting wavefront aberration of an objective lens to be detected by using the apparatus for detecting wavefront aberration of an objective lens described above, comprising the steps of:

(1) enabling the test wavefront emitted by the wavefront detection system (1) to pass through the objective lens (2) to be detected, and using) ($x_{IN}$, $y_{IN}$) to denote the intersection point of the test wavefront and the pupil plane of the objective lens (2) to be detected;

(2) adjusting the planar mirror adjusting mechanism (4) so that the planar mirror (3) is positioned at the focal point of the objective lens (2) to be detected, where the test wavefront passes through the objective lens (2) to be detected and then arrives upon the planar mirror (3), the reflected wavefront reflected by the planar mirror (3) passes through the objective lens (2) to be detected again and is received by the wavefront detection system (1); and using ($x1_{out}$, $y1_{out}$) to denote the intersection point of the reflected wavefront and the pupil plane of the objective lens (2) to be detected;

(3) detecting, by the wavefront detection system (1), the reflected wavefront, calculating and deriving phase information $Wt1(x1_{out}, y1_{out}) = W_{lens}(x_{IN}, Y_{IN}) + W_{lens}(x1_{OUT}, y1_{out})$, where $W_{lens}$, is wavefront aberration of the objective lens (2) to be detected;

(4) adjusting, by the planar mirror adjusting mechanism (1), so that the planar mirror (3) is positioned at the focal point of the objective lens (2) to be detected and the angle the planar mirror (3) tilts at is changed, where the wavefront detection system (1) receives and detects the reflected wavefront Wt2 when the angle is changed;

(5) repeating step 4), recording the reflected wavefronts Wtn received and detected by the wavefront detection system (1) under different angles the planar mirror (3) tilts at, where n is greater than or equal to 3, indicating a sequence of the different angles and taking values of 3, 4, 5, and so on;

(6) selecting an m-term polynomial $P_i$ for fitting the wavefront aberration of the objective lens (2) to be detected, and calculating a polynomial $Pn_i(xn_{OUT}, yn_{OUT}) = P_i(xn_{out}, yn_{out})$, i=1~m corresponding to each reflected wavefront Wtn according to the angle the planar mirror (3) tilts at;

(7) calculating a polynomial coefficient $C_m$ of the wavefront aberration of the objective lens (2) to be detected corresponding to the polynomial $P_m$ through a formula as follows:

$$\begin{vmatrix} Pcol1_1 & Pcol1_2 & \cdots & Pcol1_m \\ Pcol2_1 & Pcol2_2 & \cdots & Pcol2_m \\ \vdots & \vdots & \ddots & \vdots \\ Pcoln_1 & Pcoln_2 & \cdots & Pcoln_m \end{vmatrix} \begin{vmatrix} C_1 \\ C_2 \\ \vdots \\ C_m \end{vmatrix} = \begin{vmatrix} Wtcol1 \\ Wtcol2 \\ \vdots \\ Wtcoln \end{vmatrix}.$$

where $Pcoln_i$ and Wtcoln are column vectors of $Pn_i$ and Wtn, respectively; and (8) deriving a result of fitting expressed by polynomial $P_i$ on the basis of the polynomial coefficient $C_m$.

In the present invention, at least three sets of return wavefronts Wt1, Wt2, Wt3, under different angles have to be measured to obtain the wavefront aberration of the objective lens (2) to be detected through fitting. The m-term polynomial $P_i$ is a Zernike polynomial or a Legendre polynomial.

The present invention is more advantageous than the current technology in that:

(1) the spherical mirror is replaced with the planar mirror for detection, hence the detection cost is lower, and the detectable NAs of the objective lens is not restricted by parts of the detection system; and (2) the range of mirror reflection is a limited area around the focal point, so the influence of the machining error of the entire mirror on the detection accuracy can be minimized.

DETAILED DESCRIPTION OF THE INVENTION

The present invention is further described below with reference to examples and drawings, but the scope thereof should not be limited thereto.

Example 1

Figure 1:
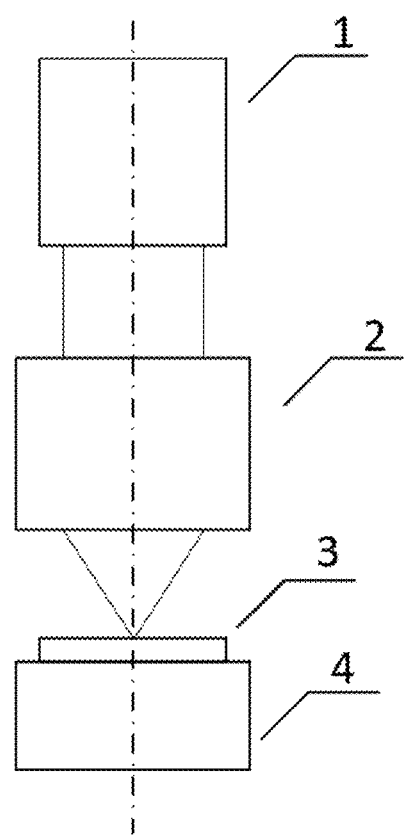
FIG. 1 shows the apparatus for detecting wavefront aberration of an objective lens of the present invention.

As shown in FIG. 1, in the apparatus for detecting wavefront aberration of an objective lens of the present invention, a test wavefront emitted by a DynaFiz interferometer 1 passes through a microscope objective 2 to be detected (NA=0.14, with a focal length of 40 mm) and is converged at a focal point. A planar mirror 3 is fixed on an adjusting mechanism 4, and the adjusting mechanism 4 has the functions of three-dimensional displacing, and pitch and yaw regulating. The adjusting mechanism 4 adjusts so that the planar mirror 3 is positioned at the focal point, and the mirror plane is parallel to the focal plane. The wavefront passing through the microscope objective 2 to be detected is reflected by the planar mirror 3 at the focal point, gets reversed by 180°, and then passes through the microscope objective 2 to be detected again. The aberration brought about by the former and later return wavefronts that pass through the microscope objective 2 to be detected is the result of a doubled wavefront aberration of the microscope objective 2 to be detected after the 180° reversion. The return wavefront is detected and recorded by the DynaFiz interferometer 1 as shown in FIG. 2.

The adjusting mechanism 4 adjusts so that planar mirror 3 is still positioned at the focal point, but tilts at an angle of 1.457° in direction X of a pixel coordinate system of the DynaFiz interferometer 1 detector. At the time, after the wavefront passing through the microscope objective 2 to be detected is reflected by the planar mirror 3 at the focal point, only a partial wavefront can pass through the microscope objective 2 to be detected again and get detected by the DynaFiz interferometer 1. The detected wavefront is shown in FIG. 3.

The adjusting mechanism 4 adjusts so that planar mirror 3 is still positioned at the focal point, but tilts at an angle of 2.343° in direction Y of a pixel coordinate system of the DynaFiz interferometer 1 detector. At the time, after the wavefront passing through the microscope objective 2 to be detected is reflected by the planar mirror 3 at the focal point, only a partial wavefront can pass through the microscope objective 2 to be detected again and get detected by the DynaFiz interferometer 1. The detected wavefront is shown in FIG. 4.

Figure 2:
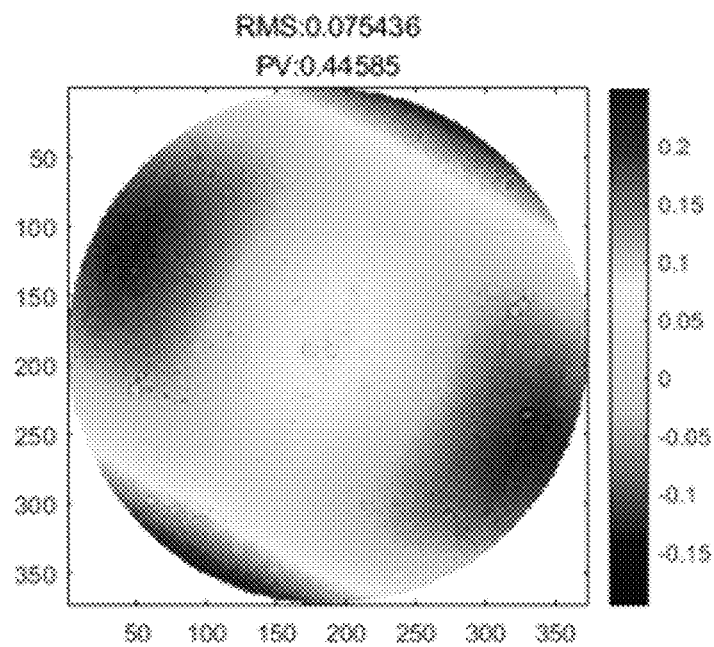
FIG. 2 shows the return wavefront collected when an angle a planar mirror tilts at is 0 in Example 1.
Figure 3:
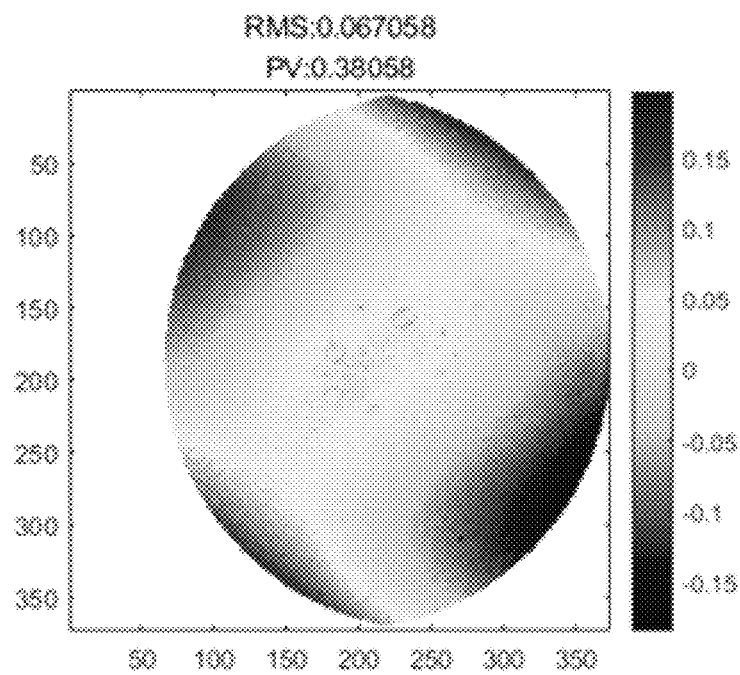
FIG. 3 shows the return wavefront collected when the angle the planar mirror tilts at is 1.457° in direction X of a detector in Example 1.
Figure 4:
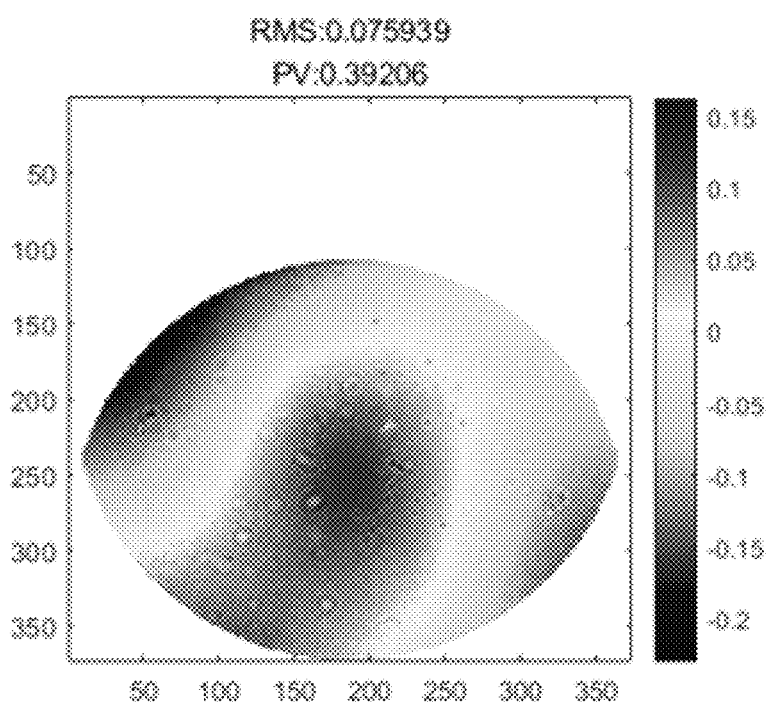
FIG. 4 shows the return wavefront collected when the angle the planar mirror tilts at is 2.343° in direction Y of the detector in Example 1.
Figure 5:
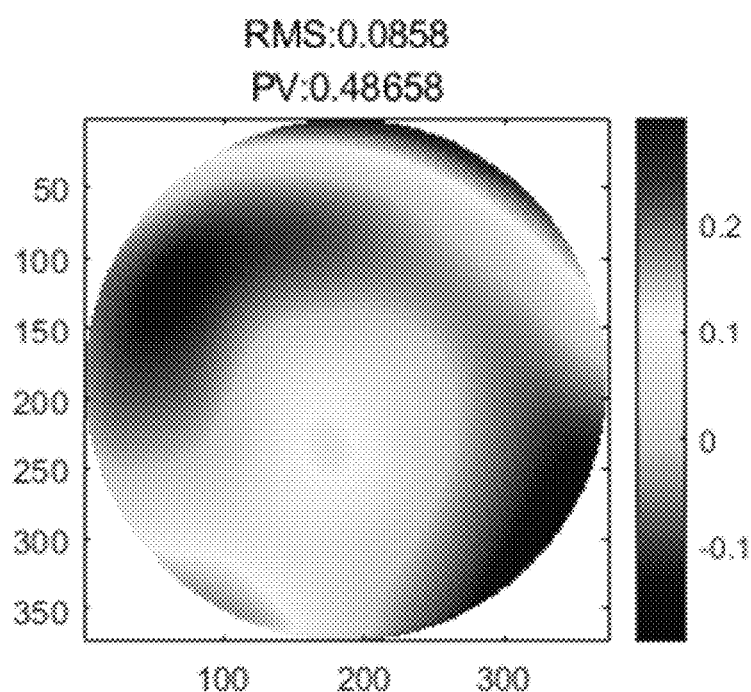
FIG. 5 shows the result of fitting the wavefront aberration of the objective lens to be detected in Example 1.
Figure 6:
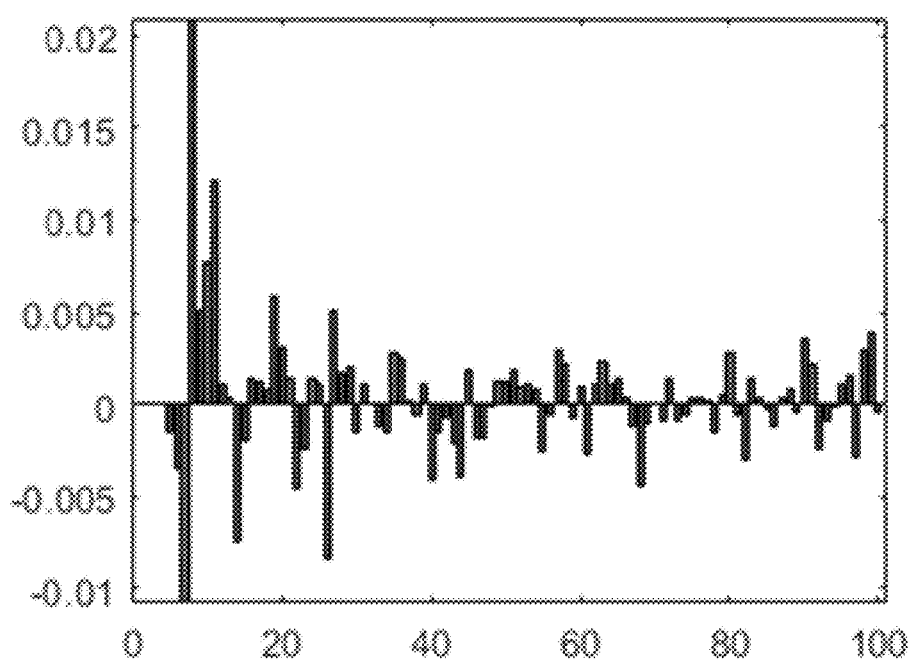
FIG. 6 shows the fitting coefficient for the wavefront aberration of the objective lens to be detected in Example 1.

A 100-term Zernike polynomial is taken to represent the wavefront aberration of the microscope objective lens 2 to be detected, and the polynomial expressions corresponding to the return wavefronts shown in FIGS. 2 to 4 are calculated. The derived polynomial expressions and the return wavefronts are subjected to least-square fitting to obtain a result of fitting the wavefront aberration of the microscope objective lens 2 to be detected, and a corresponding result of coefficients of the 100-term Zernike polynomial is obtained, which are shown in FIGS. 5 and 6, respectively.

Example 2

As shown in FIG. 1, in the apparatus for detecting wavefront aberration of an objective lens of the present invention, a test wavefront emitted by a DynaFiz interferometer 1 passes through a microscope objective lens 2 to be detected (NA=0.9, with a focal length of 1.8 mm) and is converged at a focal point. A planar mirror 3 is fixed on an adjusting mechanism 4, and the adjusting mechanism 4 has the functions of three-dimensional displacing, and pitch and yaw regulating. The adjusting mechanism 4 adjusts so that the planar mirror 3 is positioned at the focal point, and the mirror plane is parallel to the focal plane. The wavefront passing through the microscope objective 2 to be detected is reflected by the planar mirror 3 at the focal point, gets reversed by 180°, and then passes through the microscope objective 2 to be detected again. The aberration brought about by the former and later return wavefronts that pass through the microscope objective 2 to be detected is the result of a doubled wavefront aberration of the microscope objective 2 to be detected after the 180° reversion. The return wavefront is detected and recorded by the DynaFiz interferometer 1 as shown in FIG. 7.

The adjusting mechanism 4 adjusts so that planar mirror 3 is still positioned at the focal point, but tilts at an angle of 10.501° in direction X of a pixel coordinate system of the DynaFiz interferometer 1 detector. At the time, after the wavefront passing through the microscope objective lens 2 to be detected is reflected by the planar mirror 3 at the focal point, only a partial wavefront can pass through the microscope objective lens 2 to be detected again and get detected by the DynaFiz interferometer 1. The detected wavefront is shown in FIG. 8.

The adjusting mechanism 4 adjusts so that planar mirror 3 is still positioned at the focal point, but tilts at an angle of 5.893° in direction Y of a pixel coordinate system of the DynaFiz interferometer 1 detector. At the time, after the wavefront passing through the microscope objective lens 2 to be detected is reflected by the planar mirror 3 at the focal point, only a partial wavefront can pass through the microscope objective lens 2 to be detected again and get detected by the DynaFiz interferometer 1. The detected wavefront is shown in FIG. 9.

Figure 7:
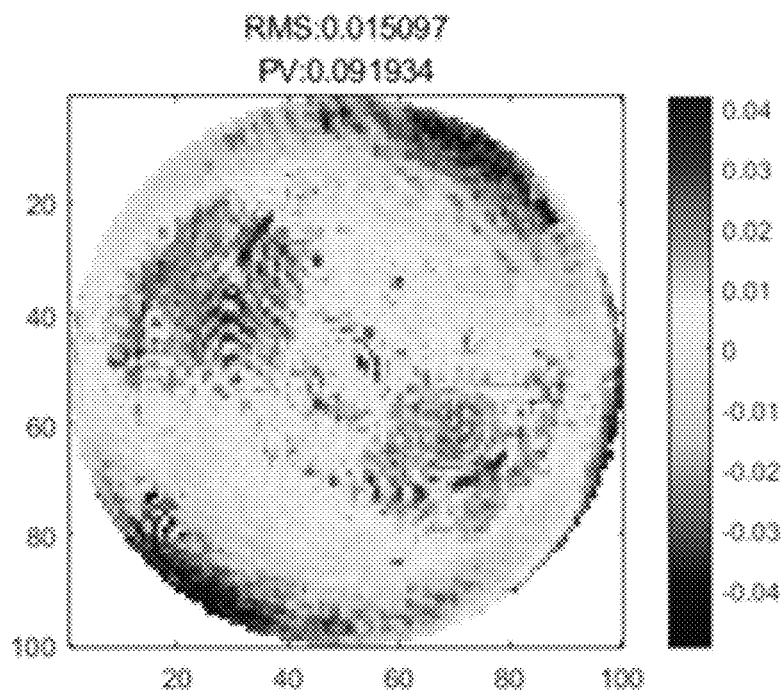
FIG. 7 shows the return wavefront collected when the angle the planar mirror tilts at is 0 in Example 2.
Figure 8:
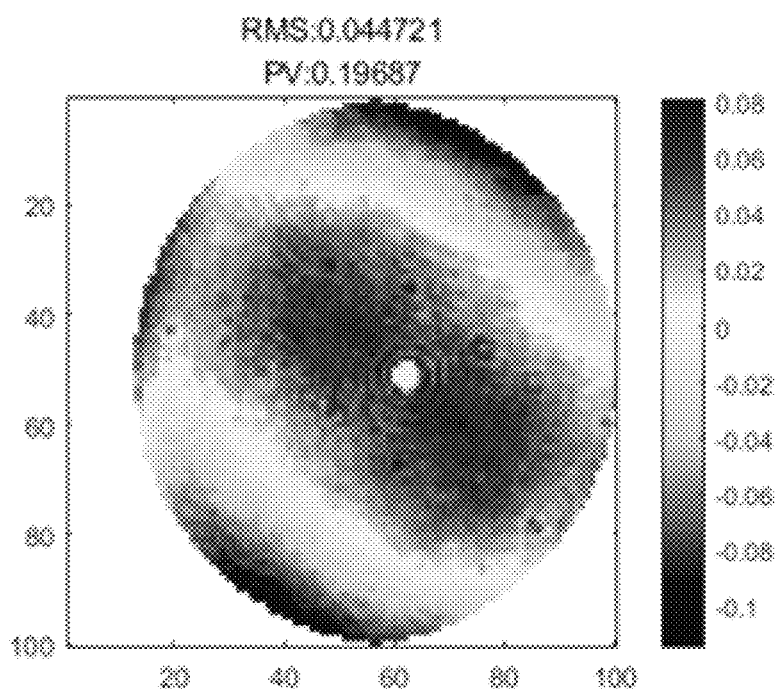
FIG. 8 shows the return wavefront collected when the angle the planar mirror tilts at is 1.457° in direction X of a detector in Example 2.
Figure 9:
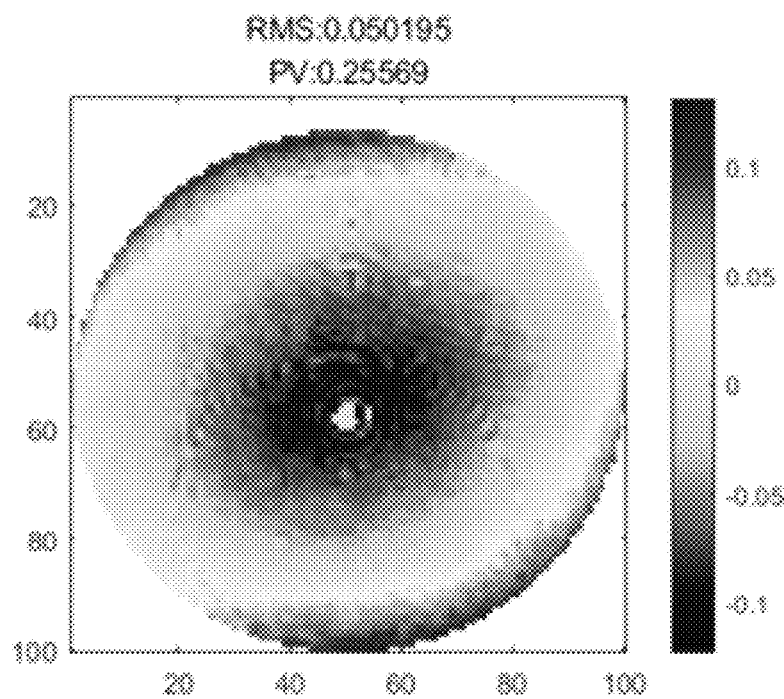
FIG. 9 shows the return wavefront collected when the angle the planar mirror tilts at is 2.343° in direction Y of the detector in Example 2.
Figure 10:
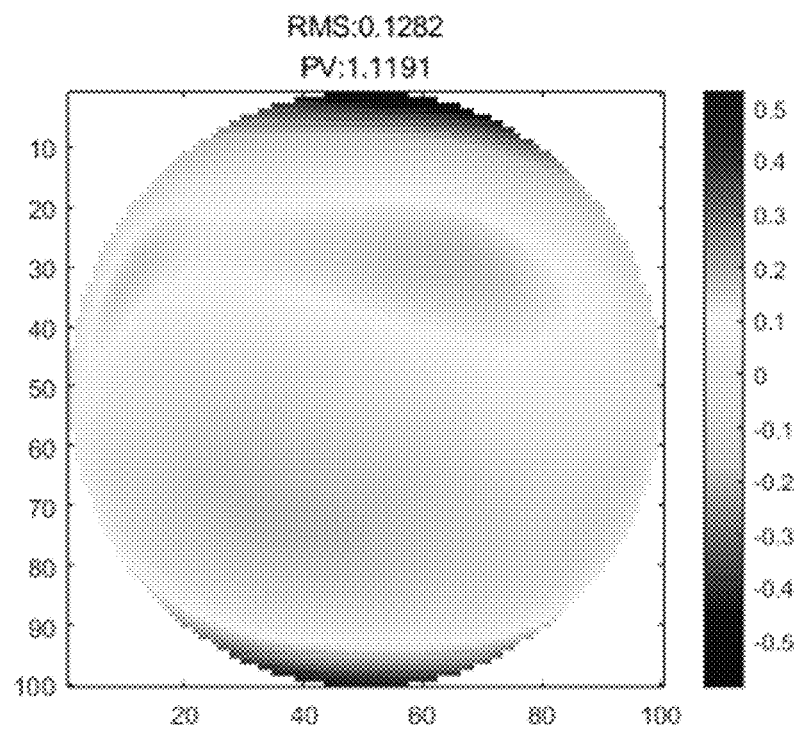
FIG. 10 shows the result of fitting the wavefront aberration of the objective lens to be detected in Example 2.
Figure 11:
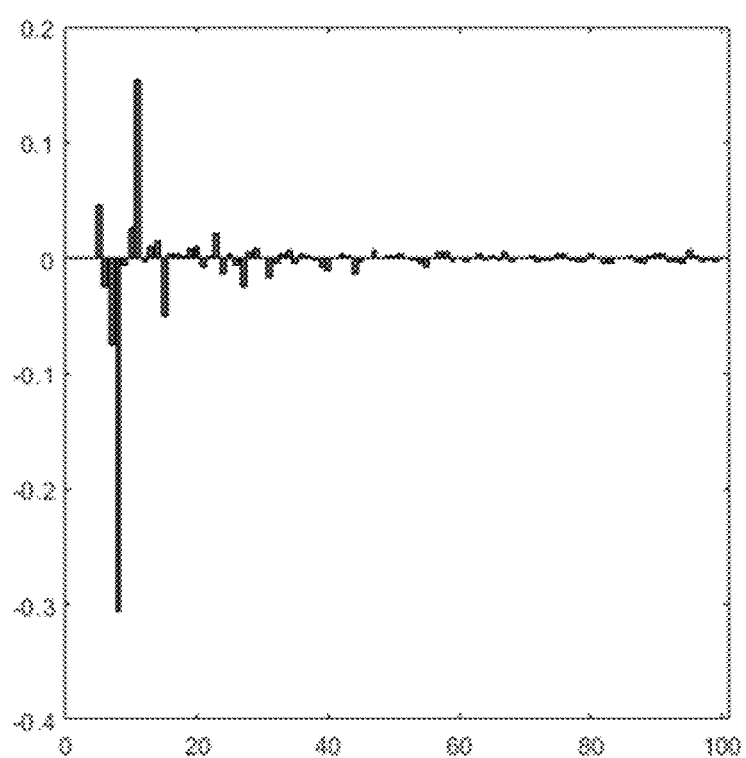
FIG. 11 shows the fitting coefficient for the wavefront aberration of the objective lens to be detected in Example 2.

A 100-term Zernike polynomial is taken to represent the wavefront aberration of the microscope objective 2 to be detected, and the polynomial expressions corresponding to the return wavefronts shown in FIGS. 7 to 9 are calculated. The derived polynomial expressions and the return wavefronts are subjected to least-square fitting to obtain a result of fitting the wavefront aberration of the microscope objective 2 to be detected, and a corresponding result of coefficients of the 100-term Zernike polynomial is obtained, which are shown in FIGS. 10 and 11, respectively.

The present invention features a simple structure, requires low costs, and a detectable numerical aperture (NA) of the objective lens is not restricted by parts in the system, moreover, the result of fitting the wavefront aberration of the objective lens to be detected may have a margin of error lower than 10%.

We claims:

1. A method for detecting wavefront aberration of an objective lens to be detected by using an apparatus comprising a wavefront detection system (1), a planar mirror (3) with an angle the planar mirror (3) tilts at relative to an optical axis of the wavefront detection system (1), a planar mirror adjusting mechanism (4) bearing the planar mirror (3), and an objective lens (2) placed between the wavefront detection system (1) and the planar mirror (3), comprising:

step (1) enabling a test wavefront emitted by the wavefront detection system (1) to pass through the objective lens (2) and using $(x_{IN}, y_{IN})$ to denote an intersection point of the test wavefront and a pupil plane of the objective lens (2);

step (2) adjusting the planar mirror adjusting mechanism (4) so that the planar mirror (3) is positioned at a focal point of the objective lens (2), wherein the test wavefront passes through the objective lens (2) and arrives upon the planar mirror (3), a reflected wavefront reflected by the planar mirror (3) passes through the objective lens (2) again and is received by the wavefront detection system (1); and using $(x1_{OUT}, y1_{OUT})$ to denote an intersection point of the reflected wavefront and the pupil plane of the objective lens (2);

step (3) detecting, by the wavefront detection system (1), the reflected wavefront, calculating and deriving phase information $Wt1(x1_{OUT}, y1_{OUT}) = W_{lens}(x_{IN}, y_{IN}) + W_{lens}(x1_{OUT}, y1_{OUT})$, wherein $W_{lens}$ is wavefront aberration of the objective lens (2);

step (4) adjusting, by the planar mirror adjusting mechanism (1), so that the planar mirror (3) is positioned at the focal point of the objective lens (2) and the angle the planar mirror (3) tilts at is changed, wherein the wavefront detection system (1) receives and detects the reflected wavefront Wt2 when the angle is changed;

step (5) repeating step (4), recording the reflected wavefronts Wtn received and detected by the wavefront detection system (1) under different angles the planar mirror (3) tilts at, wherein n is an integer that is greater than or equal to 3 and indicates a sequence of the different angles;

step (6) selecting an m-term polynomial $P_i$ for fitting the wavefront aberration of the objective lens (2), and calculating a polynomial $Pn_i(xn_{OUT}, yn_{OUT}) = P_i(c_{IN}, y_{IN}) + P_i(xn_{OUT}, yn_{OUT})$, i=1~m corresponding to each reflected wavefront Wtn according to the angle the planar mirror (3) tilts at;

step (7) calculating a polynomial coefficient $C_m$ of the wavefront aberration of the objective lens (2) corresponding to the polynomial $P_m$ through a formula as follows:

$$\begin{vmatrix} Pcol1_1 & Pcol1_2 & \ldots & Pcol1_m \\ Pcol2_1 & Pcol2_2 & \ldots & Pcol2_m \\ \vdots & \vdots & \ddots & \vdots \\ Pcoln_1 & Pcoln_2 & \ldots & Pcoln_m \end{vmatrix} \begin{vmatrix} C_1 \\ C_2 \\ \vdots \\ C_m \end{vmatrix} = \begin{vmatrix} Wtcol1 \\ Wtcol2 \\ \vdots \\ Wtcoln \end{vmatrix}.$$

wherein $Pcoln_i$ and Wtcoln are column vectors of $Pn_i$ and Wtn, respectively; and step (8) deriving a result of fitting expressed by polynomial $P_i$ on basis of the polynomial coefficient $C_m$.

2. The method for detecting wavefront aberration according to claim 1, wherein at least three sets of return wavefronts Wt1, Wt2, Wt3, under different angles are measured to obtain the wavefront aberration of the objective lens (2) through fitting.

3. The method for detecting wavefront aberration according to claim 1, wherein the m-term polynomial $P_i$ is a Zernike polynomial or a Legendre polynomial.

* * * * *